United States Patent Office 3,533,115
Patented Oct. 13, 1970

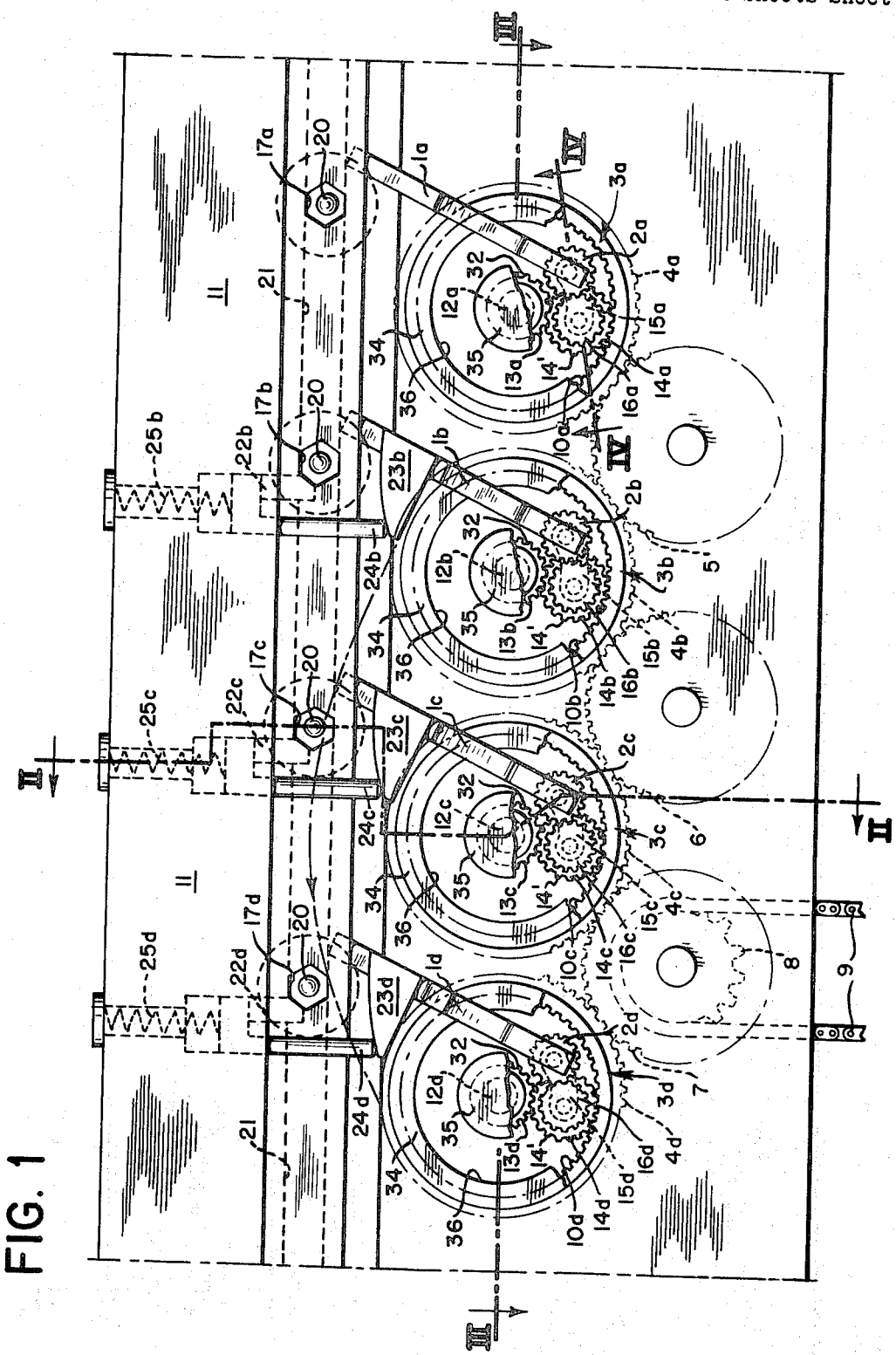

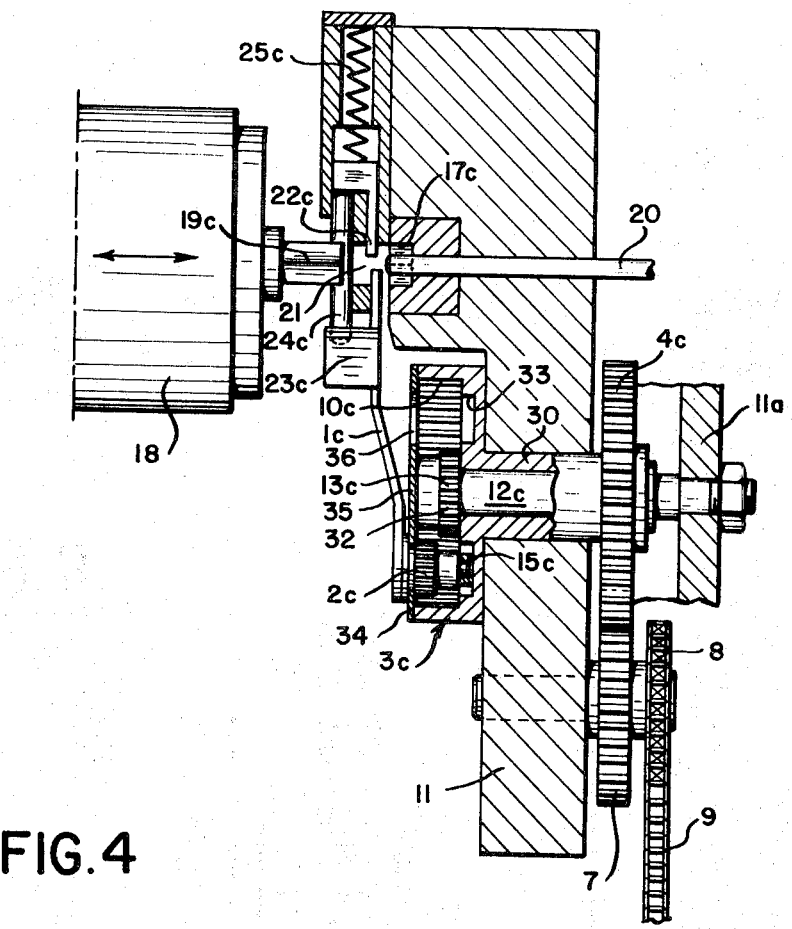
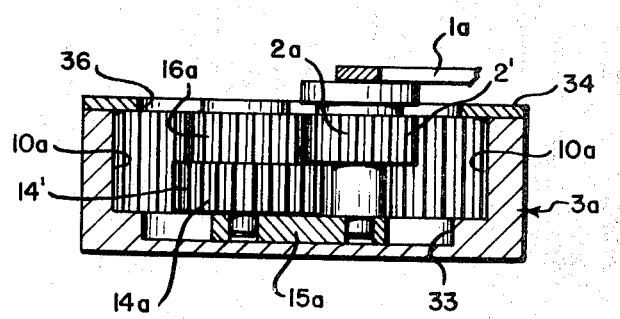

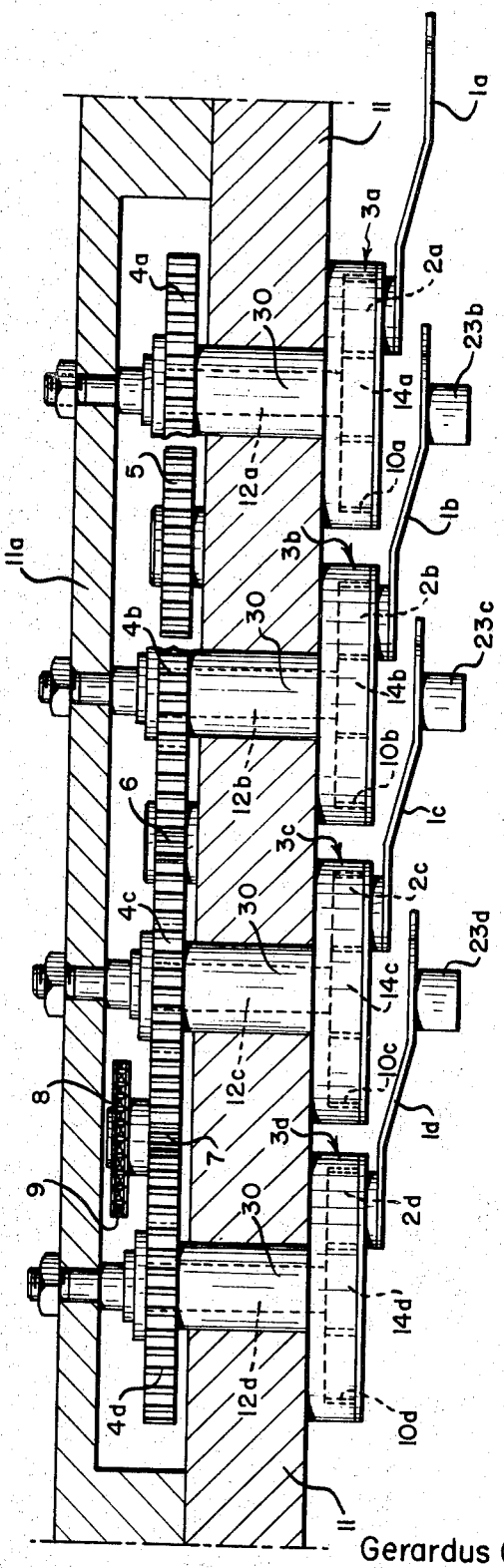

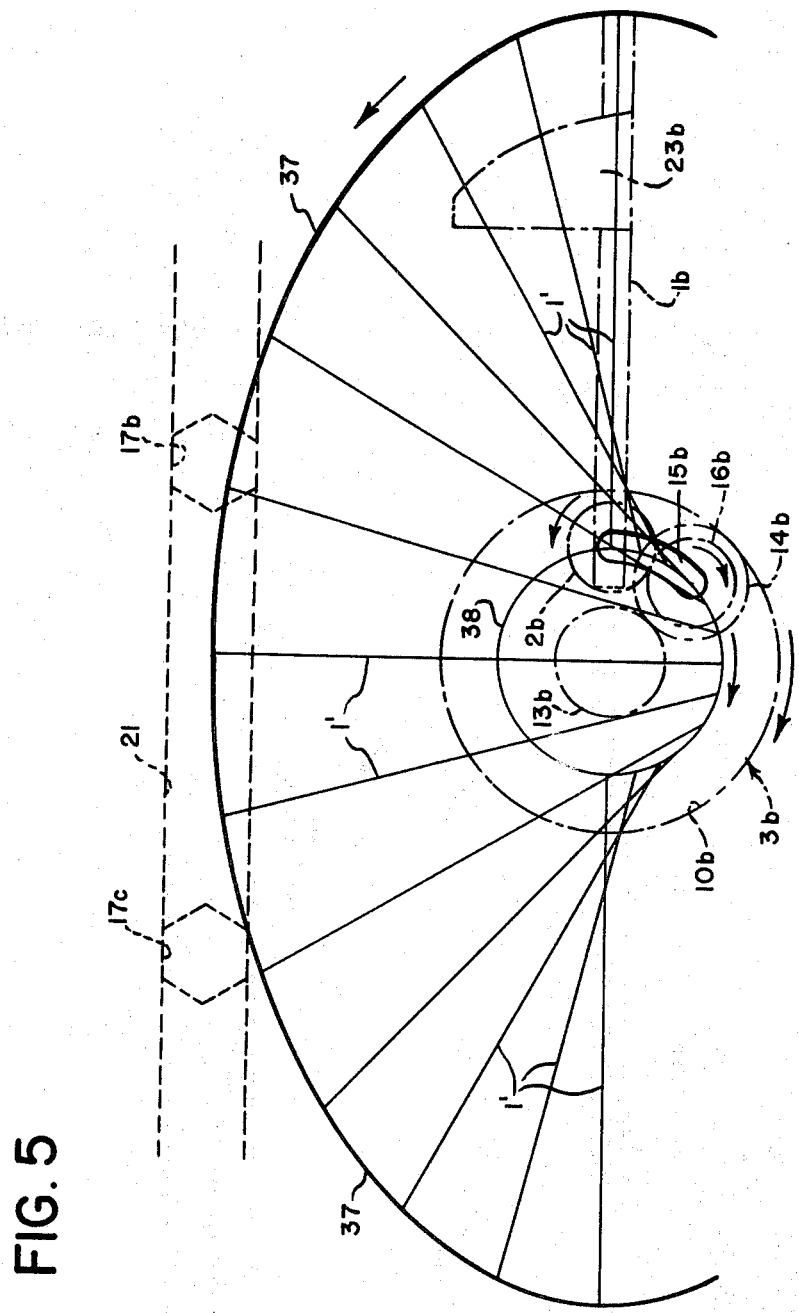

3,533,115
HIGH SPEED ARTICLE FORMERS AND TRANSFER MECHANISMS THEREFOR
Gerardus C. van de Meerendonk, Helmond, Netherlands, assignor to Nedschroef Octrooi Maatschappij N.V., Helmond, Netherlands, a limited-liability company
Filed May 16, 1968, Ser. No. 729,763
Claims priority, application Netherlands, Feb. 9, 1968, 6,801,906
Int. Cl. B21k 27/00, 1/64
U.S. Cl. 10—162                    10 Claims

ABSTRACT OF THE DISCLOSURE

The machine disclosed is of the type including a series of forming stations provided with die matrices cooperating with a reciprocable carriage having tools for effecting forming operations at each of the stations. The machine is provided with a transfer mechanism, including rotatable one arm levers which move workpieces from one station to the next, wherein the inner ends of the levers are respectively attached to and rotated in one direction by pinions respectively movable around in holders rotatable on fixed axes, so that the outer ends of the arms describe an ellipse, the major axis of which is substantially parallel to the line of forming stations. Certain of the levers or arms are provided with cam means which remove abutments provided to stop the workpieces at the respective stations.

Cross-reference to related application

This application corresponds to an application filed in the Netherlands on Feb. 9, 1968, Ser. No. 6,801,906, the priority of which is claimed.

BACKGROUND OF THE INVENTION

1. Field of the invention

The present invention relates to a machine for manufacturing articles, such as bolts, nuts and other articles in successive operations in which the articles are successively subjected to a series of working steps in matrices provided with ejecting means, said matrices being in spaced relation along the frame or die block of the machine. This machine is provided with means for simultaneously and stepwide transferring a series of articles to be worked on along the working stations, so that each article is supplied to the first station and removed from the last station of the series.

2. Description of the prior art

A machine of the type referred to above is disclosed and claimed in the applicant's U.S. Patent No. 3,274,626, granted Sept. 27, 1966. The machine of that patent is provided with a series of parallel rotatable arms or levers for transferring workpieces from one station to the next, the arms being rotated in synchronism with a tool carrier, which carries the working punches or tools for the respective stations.

The primary object of the present invention is to provide an improvement on the transfer mechanism of the above-mentioned patent, so that a machine may be provided which can handle a larger range of sizes of articles to be worked on and produced. It is a further object of the invention to provide an improvement in the operation of the transfer arms over that of said patent, so that the force applied to the workpieces during their transfer is more effective. Another object of the invention is to provide an improved stop or abutment for the workpieces, so that the abutments firmly hold the workpieces in front of the die matrices but are readily releasable when the workpieces are to be transferred.

BRIEF SUMMARY OF THE INVENTION

In accordance with the invention, the one-armed transfer levers are provided with means to effect their rotation in such a way that their outer ends respectively describe paths which are elongated in the direction of the transport of the articles to, between and from the respective working stations.

In an embodiment of the machine according to the present invention, the transfer arms or levers are driven in such a way that, during their rotation, their axes of rotation are themselves respectively revolved in circles about fixed axes. This arrangement and the mechanisms for effecting it are such that the ends of the transfer arms respectively describe elliptical paths, the longer axes of which are substantially parallel to a line running through the centers of the series of working stations.

Furthermore, the machine of the present invention is provided with abutment means at a plurality of the working stations for stopping or holding the articles moved thereto directly in front of the working matrices, and the transfer arms for such stations are respectively provided with cams which respectively lift the abutment means, after the articles have been worked on and again ejected into a position to be transferred. The cams are arranged so that they come into operation as the outer end portions of the levers respectively approach the workpieces, so that the articles are released at the respective stations for transfer to the next station of the series.

BRIEF DESCRIPTION OF DRAWINGS

An embodiment of a machine according to the invention is shown by way of example in the drawings accompanying this application.

In the drawings:

FIG. 1 is a front elevational view of a portion of the machine illustrating diagrammatically the means for shifting or transferring simultaneously and stepwise a series of articles to be worked on and their driving mechanisms according to the invention;

FIG. 2 is a vertical sectional view taken approximately along the irregular line II—II of FIG. 1 showing one of the transfer or advancing arms in an upright position;

FIG. 3 is a longitudinal sectional view taken along the line III—III of FIG. 1, in which the transfer arms are shown in substantially horizontal positions in the up stroke, and in overlapping relationship;

FIG. 4 is a detailed sectional view taken on the line IV—IV of FIG. 1; and

FIG. 5 is a diagrammatic view illustrating the operation of one of the transfer arms through its upper transferring movement.

In the drawings the four transfer arms or levers 1a–1d for advancing workpieces or blanks from one working station to the next of the four working stations or die matrices 17a–17d, arranged across the frame or die block 11 (FIG. 1) are, respectively, attached to rotatable pinions 2a–2d mounted respectively in rotatable holders 3a–3d arranged in line and in spaced relation on the face of the frame or die block below the working stations. Each of the rotatable holders, as shown in FIG. 3, and more in detail in FIG. 2 includes a hollow shaft 30 extending through the die block 11 and rotatable on a fixed trunnion, as 12c in FIG. 2, having an enlarged end portion 32 provided with laterally-projecting gear teeth, as 13c in FIG. 2. The trunnions 12a–12d extend through the hollow shafts and their inner ends are fixed to a spaced support 11a located in back of the die block 11, as shown in FIGS. 2 and 3.

The inner ends of the hollow shafts 30, as shown in FIG. 2, for example, extend into the space between the die block 11 and the support 11a and respectively carry gear wheels 4a–4d, FIG. 3, fixed thereto for rotating the respective holders 3a–3d. Also located back of the die block 11 are intermediate gears 5, 6 and 7 meshing with the gear wheels 4a–4d in the manner indicated in FIG. 1 and shown more in detail in FIGS. 2 and 3. The system of gearing 4a–4d, 5, 6 and 7 is connected with a drive comprising chain gearing, including a spur wheel 8 mounted on the shaft of the intermediate gear 7 and a chain 9, as shown in FIG. 2. The spur wheel 8 is also shown in FIG. 3.

The holders 3a–3d respectively comprise an inner rim or ring gear 10a–10d having inwardly-projecting teeth while the outer enlarged ends, 32 in FIG. 2, of the fixed trunnions 12a–12d bear against the respective inner surfaces of the holders 3a–3d and are respectively provided with gear teeth 13a–13d. Intermediate pinions 14a–14d respectively have projecting gear teeth 14' cooperating with the inner teeth 13a–13d and with the teeth 10a–10d located on the inside respectively of the holders 3a–3d. The pinions 14a–14d and 2a–2d are respectively rotatably carried in meshing relation in arcuate connecting elements or plates 15a–15d by which the two pinions in each holder are held in meshing relation in the annular space of the holder.

When the rotatable holders 3a–3d are rotated by their respective gears 4a–4d, by means of the intermeshing gears 5, 6 and 7, the pinions 2a–2d and 14a–14d mounted respectively in the connecting elements 15a–15d, will be taken along circular paths respectively between the internal teeth 10a–10d and the external teeth 13a–13d. This rotation will respectively rotate the pinions 14a–14d in the same direction as that of the rotation of the respective holders 3a–3d.

The pinions 2a–2d and 14a–14d have structures as shown in FIG. 4, illustrated with respect to the first station showing that the pinion 14a in question has a lower geared portion having teeth 14' and an upper portion of smaller diameter having gear teeth 16a. The latter teeth mesh with gear teeth 2' on the upper portion of the pinion 2a and drive it in the manner shown in FIG. 4. FIG. 4 also shows the structure by which the pinions 2a and 14a are pivotally mounted in the connecting element 15a, which is taken along in an annular bottom channel 33 in the holder 3a when the holder is rotated. Since the teeth 2' of the pinion 2a mesh with the teeth 16a of the pinion 14a, the pinion 2a and its arm 1a are rotated in a direction opposite to that of the direction of rotation of the holder 3a and pinion 14a.

Each of the holders 3a–3d includes an attached cover including a flat sheet-metal ring 34 and a central disc 35 located in the same plane as shown in FIGS. 2 and 4 defining an annular channel 36, in which the pinions 2a and 14a are fitted and by which they are retained in the manner indicated in FIG. 4. The pinions 2a–2d, as illustrated in FIGS. 2 and 4, are each provided with a groove receiving edge portions of the elements 34 and 35, while the trunnions, for example as shown by the trunnion 14a in FIG. 4, is provided with a shoulder fitting inside of these elements. The disc 35 is conveniently attached to a block attached to the head 32, as shown in FIG. 2.

The four transfer units shown in FIG. 1 have the same structure as that shown in FIGS. 2 and 4, and since the pinions 14a–14d respectively have the same number of teeth 14' as the external teeth 13a–13d of the fixed trunnions 12a–12d, the said pinions will make one rotation as they make one revolution respectively about the fixed trunnions 12a–12d. The pinions 14a–14d also have the same number of teeth 16a–16d as the teeth 2' of the respective pinions 2a–2d, on which the advancing arms 1a–1d are respectively attached, and effect their rotation. Consequently the pinions 2a–2d and the transfer arms 1a–1d also make one rotation as they revolve once about the respective fixed trunnions 12a–12d. At the same time the ends of the transfer arms 1a–1d each describe an elliptic path, as illustrated in FIG. 5 for the transfer arm 1b and its associated holder and elements thereof. The direction of rotation of each of the elements, arm 1b, pinion 2b, pinion 14b and holder 3b is shown by arrows in FIG. 5.

As shown in FIG. 5, one long side of the oblong elliptical figure described or evolved by the end of a transfer arm, such as the arm 1b, is located at the top, so that the major axis of the ellipse is substantially horizontal and parallel to the series of stations 17a–17d. The arrangement of the holders, as illustrated by the holder 3b in FIG. 5 along with the pinions 2b and 14b is such that the transfer arms are rotated in a counterclockwise direction to move the workpieces from one station to the next. It will be noted that as the arm 1b moves upwardly, its end describes the elliptical arc shown as a full line 37. At the same time the pinions 2b and 14b gradually move down counterclockwise causing the end of the arm 1b to describe an arc curving only slightly from the horizontal, from stations 17b to 17c, so that the force applied to a workpiece at the station 17b will be almost directly from the back of the workpiece with very little upward thrust. There is, therefore, a considerable advantage in having the ends of the transfer arms follow an elliptical path positioned in the manner shown in FIG. 5.

The full lines 1' in FIG. 5 show the successive positions of the arm 1b, as its outer end describes the elliptical arc. The inner ends of these lines also show the successive positions of the axis of rotation of the pinion 2b or the pivot axis of the arm 1b along the full line circle 38, as the pinion moves clockwise in the holder 3b. It will be noted that along the upper flattened portion of the elliptical arc, the inner end of the arm 1b, or the axis of the pinion 2b will be in the lower portion of the holder 3b, which, of course, is rotated on a fixed horizontal axis.

The material to be formed into pressed or forged articles and worked on in the machine is supplied in the usual way, cut off, at a cut-off station to form blanks, delivered in succession to the first matrix 17a where they are forced into the die cavity by a punch. When a machine is running, there is a blank or workpiece being acted on simultaneously in each of the stations or die matrices 17a–17d. The general features concerning the use of a guideway along the matrices and the movement of a number of the workpieces therealong are described in the above-mentioned patent. The four stations shown in FIG. 1 are similar and, therefore, the operation is conveniently described in connection with the showing in FIG. 2 and the station 17c. It will be understood from FIG. 1 that a cut-off blank is acted upon in succession in die matrices 17a, 17b and then in the die matrix 17c shown in FIG. 2.

FIG. 2 illustrates the equipment at station 17c, which is similar for the other three stations. FIG. 2 shows a reciprocating carriage 18 diagrammatically with a punch 19c, it being understood that the carriage, as usual, extends across the front of all of the stations and carries a punch or other tool for each station. The position of the parts in FIG. 2 is at a time when the workpiece is positioned in the guideway 21 in front of the die matrix of the station 17c by the ejecting pin 20. The punch 19c is outside an opening in the front of the guideway 21, The carriage 18 has already moved to the right in FIG. 2, to move the workpiece into the die cavity and has subjected it to a forming operation therein. As the carriage retracted, the formed workpiece was ejected into the guideway 21 by ejecting pin 20, into a position ready to be moved to the next station 17d by the upper portion of the transfer arm 1c. The guideway 21 is provided with a bottom slot to accommodate the upper portions of the transfer arms.

The stations 17b–17d are respectively provided with pawls 22b–22d, having a beveled engagement surface as shown in FIG. 1, which serves to stop the workpieces exactly in front of the die matrices of the corresponding stations. The respective pawls constitute abutments for the workpieces moved along the guideway 21 by the respective transfer arms 1a–1c. The pawls are movable upwardly out of the guideway 21 by the respective pins 24b–24d, which extend to a point below the structure of the guideway 21, as indicated in FIG. 2. The pawls 22b–22d and the connected pins 24b–24d are biased downwardly in the frame or die block structure respectively by springs 25b–25d.

The transfer arms 1b–1d are provided with cam members 23b–23d which respectively act on the pins 24b–24d, as the free ends of the arms approach the workpieces in the guideway 21, to lift the abutments, as in FIG. 1. The projecting ends of the arms then move the workpieces along the guideway 21 and as soon as the pins come off the cams, the respective pawls drop back into their abutment position, so that the workpieces from preceding stations respectively abut them and are in position for the next forward movement of the carriage 18 and punches 19. The outer end of the transfer arm 1c, as shown in FIG. 1, follows the indicated arc and engages the workpiece at station 17c to deliver it to station 17d where the end of the arm comes off the workpiece as it is stopped by the pawl 22d. The end transfer arm 1d, of course, moves each of the workpieces out of the machine in succession from the final station.

In the embodiment illustrated in FIG. 1 the first station is not illustrated as being provided with an abutment pawl or the arm 1a with a cam, since the blanks as cut from stock may be moved endwise into position in front of the die matrix 17a, dropped directly into that position from the cut-off means, or be cut off directly in front of the die matrix and moved directly thereinto.

I claim:

1. In a machine for forming articles such as perforated articles, bolt and nut blanks and the like, including a frame,
  (a) a series of spaced stationary dies having openings for receiving workpieces,
  (b) a reciprocable tool carrier movable toward and away from the die openings for pressing workpieces therein,
  (c) workpiece guiding means located adjacent the dies,
  (d) a transfer mechanism for moving workpieces in succession along the guiding means from a position in front of one die opening to a position in front of the next die opening in the series,
  (e) an abutment means for stopping the workpieces at a position in front of the die openings to which they are moved by the transfer means,
  (f) the transfer mechanism including a rotatable transfer arm having one end pivotally mounted for rotation and its other projecting free end arranged so that its projecting end portion during rotation is moved along the guiding means to engage a workpiece carried thereby in a position in front of said one die opening and move it to a position in front of said next die opening and into engagement with the abutment means thereat,
  (g) and means for rotating the transfer arm on its pivot axis,
  wherein the improvement comprises
  (h) means actuated by the transfer arm as its outer end portion approaches the workpiece on the guiding means in front of said one die opening for moving said abutment means from blocking the movement of the workpiece from its position in front of said one die opening toward the said next die.

2. A machine as claimed in claim 1, wherein the transfer arm carries a cam for effecting the moving of the abutment means.

3. A machine as claimed in claim 2, wherein the abutment means comprises a spring biased pawl.

4. A machine as claimed in claim 3, wherein said means actuated by the transfer arm comprises a pin one end of which is connected to the pawl and the other end of which is engaged by the cam on the arm.

5. A machine as claimed in claim 1, wherein the means for rotating the transfer arm on its pivot axis includes means for causing the projecting free end of the transfer arm to move along one long side of an elliptic arc as it is moved from said one die to said next die.

6. In a machine for forming articles such as perforated articles, bolt and nut blanks and the like, including a frame,
  (a) a series of spaced stationary dies having openings for receiving workpieces,
  (b) a reciprocable tool carrier movable toward and away from the die opening for pressing workpieces therein,
  (c) workpiece guiding means located adjacent the dies,
  (d) a transfer mechanism for moving workpieces in succession along the guiding means from a position in front of one die opening to a position in front of the next die opening in the series,
  (e) the transfer mechanism including a rotatable transfer arm having one end pivotally mounted for rotation on a pivot axis and its other projecting free end arranged so that its projecting end portion during rotation is moved along the guiding means to engage a workpiece carried thereby in a position in front of said one die opening and move it to a position in front of said next die opening,
  (f) and means for rotating said transfer arm on its pivot axis,
  wherein the improvement comprises
  (g) means acting on the means for rotating the transfer arm for in turn causing the projecting end of the arm to describe a substantial portion of a long side of an elliptical arc as it moves a workpiece from a position in front of said one die opening to a position in front of said next die opening.

7. A machine as claimed in claim 6, wherein the means for rotating the transfer arm and the means acting thereon comprise, a holder rotatable on a fixed axis of rotation, a rotatable member mounted on the holder and on which the transfer arm is mounted for rotation on its pivot axis, and means on the holder responsive to the rotation of the holder for rotating said member and for revolving it bodily around the fixed axis of rotation of the holder.

8. A machine as claimed in claim 7, including a drive pinion mounted on the holder for rotation thereby, said member comprising a pinion connected to and mounted in drive relation with the drive pinion.

9. A machine as claimed in claim 8, wherein the holder is provided with a ring gear meshing with the drive pinion, and a fixed center trunnion located on the holder having peripheral teeth meshing with the teeth of the drive pinion, the intermeshing gearing being such that one rotation of the holder effects one revolution of the pinions about the axis of rotation of the holder and one rotation of the transfer arm to describe an elliptical path by its free end.

10. A machine as claimed in claim 6, including an abutment means for stopping the workpieces at a position in front of said one die opening, and means actuated by the transfer arm as it outer end portion approaches the workpiece on the guiding means in front of said one die opening for moving said abutment means from blocking movement of the workpiece from its position in front of said one die opening toward the next die.

References Cited

UNITED STATES PATENTS

| | | | |
|---|---|---|---|
| 2,657,403 | 11/1953 | Eade et al. | 10—77 |
| 3,022,526 | 2/1962 | Davis et al. | 10—12 |
| 3,120,770 | 2/1964 | Hoyt | 10—12 |
| 3,217,343 | 11/1965 | Barkocy | 10—166 |
| 3,274,626 | 9/1966 | Van de Meerendonk | 10—12 |

CHARLES W. LANHAM, Primary Examiner

E. M. COMBS, Assistant Examiner

U.S. Cl. X.R.

10—12, 76